US008642183B2

(12) United States Patent
Chen

(10) Patent No.: US 8,642,183 B2
(45) Date of Patent: Feb. 4, 2014

(54) WOOD PRESERVATION

(75) Inventor: Sung-Wei Chen, Las Vegas, NV (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/575,549

(22) PCT Filed: Apr. 6, 2012

(86) PCT No.: PCT/US2012/032487
§ 371 (c)(1),
(2), (4) Date: Jul. 26, 2012

(87) PCT Pub. No.: WO2013/151558
PCT Pub. Date: Oct. 10, 2013

(65) Prior Publication Data
US 2013/0252010 A1  Sep. 26, 2013

(51) Int. Cl.
*B32B 23/04* (2006.01)
(52) U.S. Cl.
USPC ..... 428/532; 428/536; 428/537.1; 428/537.5; 427/384; 427/389.9; 427/391; 427/392; 427/393
(58) Field of Classification Search
USPC ............ 428/532, 536, 537.1, 537.5; 427/384, 427/389.9, 391, 392, 393
See application file for complete search history.

(56) References Cited

U.S. PATENT DOCUMENTS

| | | | | |
|---|---|---|---|---|
| 755,240 | A * | 3/1904 | Powel | 428/541 |
| 755,940 | A | 3/1904 | Powell | |
| 4,354,316 | A * | 10/1982 | Schroeder | 34/389 |
| 7,300,705 | B2 * | 11/2007 | Neogi et al. | 428/532 |
| 8,088,831 | B2 * | 1/2012 | Suzuki et al. | 516/106 |
| 2004/0258941 | A1 | 12/2004 | Neogi et al. | |
| 2006/0083910 | A1 | 4/2006 | Hoglinger et al. | |
| 2008/0182752 | A1 | 7/2008 | Izumori et al. | |
| 2009/0011214 | A1 | 1/2009 | Wang | |
| 2010/0182548 | A1 | 7/2010 | Suzuki et al. | |
| 2010/0188622 | A1 | 7/2010 | Suzuki et al. | |

FOREIGN PATENT DOCUMENTS

| | | |
|---|---|---|
| AU | 2004202262 A1 | 1/2005 |
| BR | PI0401887 A | 7/2005 |
| CN | 101679682 A | 3/2010 |
| CN | 101679683 A | 3/2010 |
| EP | 1491305 A1 | 12/2004 |
| GB | 212301 * | 3/1924 |
| KR | 20100034731 A | 4/2010 |
| KR | 20100034732 A | 4/2010 |
| NZ | 532958 A | 6/2005 |
| NZ | 538107 A | 10/2005 |
| TW | 200922992 A | 6/2009 |
| TW | 200927811 A | 7/2009 |
| WO | WO 00/78793 A2 | 12/2000 |
| WO | WO2009011228 A1 | 1/2009 |
| WO | WO2009011229 A1 | 1/2009 |

OTHER PUBLICATIONS

Stamm, "Minimizing wood shrinkage . . . " US Department of Agriculture: Forest Service. Mar. 1995, No. R1143.*
Findlay, "Effect of addition of sugar on rate of decay of wood" Annals of Applied Biology, 1941 28: pp. 19-22.*
International Search Report and Written Opinion for PCT/US2012/032487 dated May 29, 2012.
Bautista et al., Effect of L-Glucose and T-Tagatose on Bacterial Growth in Media and a Cooked Cured Ham Product, *Journal of Food Protection* (Jan. 1, 2000), 63(1):71-77 (Abstract).
Cui et al., Wood products and wood protection in China, *European Journal of Wood and Wood Products* (2000), 58(5):387-391 (Abstract).
Fiddaman et al., Effect of substrate on the production of antifungal volatiles from *Bacillus subtilis*, *Journal of Applied Microbiology* (Apr. 1994), 76(4):395-405 (Abstract).
Findlay, Effect of addition of sugar on rate of decay of wood, *Annals of Applied Biology* (Feb. 1941), 28(1):19-22 (Abstract).
Hatano et al., Impact of Unnatural Nucleosides on the Control of Microbial Growth, *Biocontrol Science* (2009), 14(2):55-60.
Hexose http://en.wikipedia.org/wiki/Hexose [Printed from Internet Jul. 1, 2012].
Jebrane et al., A novel simple route to wood acetylation by transesterification with vinyl acetate, *Holzforschung* (Sep. 3, 2007), 61(2):143-147 (Abstract).
Jeffries et al., Strain selection, taxonomy, and genetics of xylose-fermenting yeasts, *Enzyme Microb Technol* (Nov. 1994), 16:922-932.
L-Glucose http://en.wikipedia.org/wiki/L-Glucose [Printed from Internet Jul. 1, 2012].
Ru et al., Effect of D-allose on prostate cancer cell lines: phospholipid profiling by nanoflow liquid chromatography-tandem mass spectrometry, *Anal Bioanal Chem* (Aug. 2011), 401(2):689-698 (Abstract).
Stamm, Minimizing Wood Shrinkage and Swelling: Treatment with Sucrose and Invert Sugar, United States Department of Agriculture, Forest Service, Madison, Wisconsin (Mar. 1955).
Accoya—Acetylated Wood, Long Life, High Performance Modified Timber, http://www.accoya.com (Mar. 20, 2012).
Accoya—Acetylated Wood, Technology, http://www.accoya.com/?s=technology (Jan. 17, 2012).
Mohebby et al., Influences of the hydro-thermal treatment on physical properties of beech wood (*Fagus orientalis*), The International Research Group on Wood Protection, Section 4, Processes and properties, 36th Annual Meeting, Bangalore, India (Apr. 24-28, 2005), pp. 1-9.
Rowell, Chemical Modification of Wood to Produce Stable and Durable Composites, *Cellulose Chemistry and Technology* (2012), 46(7-8):443-448.
Rowell, Chemical Modification of Wood, Handbook of Engineering Biopolymers—Homopolymers, Blends, and Composites, Hanser Publishers, Munich, Germany (2007), Chapter 22, pp. 673-692.

* cited by examiner

*Primary Examiner* — Leszek Kiliman
(74) *Attorney, Agent, or Firm* — Pepper Hamilton LLP

(57) ABSTRACT

Preservation of cellulose based products, such as wood, may be accomplished in an environmentally friendly manner by esterification of the wood with rare saccharides, thereby rendering the wood unfavorable for microorganism based degradation.

30 Claims, 3 Drawing Sheets

WOOD PRESERVATION

CLAIM OF PRIORITY

This application is a U.S. national stage filing under 35 U.S.C. §371 of International Application No. PCT/US2012/032487, filed 6 Apr. 2012 entitled "Wood Preservation," the disclosure of which is incorporated by reference in its entirety.

BACKGROUND

Wood is one of the most commonly used natural materials for building products. The many different kinds of woods provide a wide range of physical and mechanical properties, making wood aesthetically pleasing to look at, while also providing structural integrity. Wood is also relatively inexpensive and is easily workable. Thus, wood is a very desirable resource for use as a building material. In addition, wood is a renewable resource since mature trees can be harvested, and new trees can be planted in their place.

It is generally known that hardwoods, particularly those from tropical regions, provide a better quality wood and are less susceptible to biodegradation. Hardwoods are therefore more desirable for use in areas where biodegradation is likely, such as exterior use where they are subjected to alternating exposures of moisture and dryness. With increasing public pressure for tropical forest preservation, hardwoods are becoming less available, and ultimately more expensive.

Because of a growing demand for inexpensive wood supplies, wood plantations are turning to faster growing softwoods for higher yields. Softwoods generally have a lower density, exhibit reduced mechanical properties, and have reduced durability as compared to hardwoods. One method for increasing the quality of woods is to apply wood preservatives to provide increased resistance to biodegradation. Many wood preservation techniques are effective but most techniques require heavy metals and other toxic substances. It is therefore desirable to provide an environmentally safe treatment method for the preservation of wood.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method of preserving a cellulose based product may include treating the cellulose based product with an effective amount of at least one rare saccharide.

In another embodiment, a wood product may be preserved by treating with at least one rare saccharide.

In another embodiment, a treated wood product may include at least one rare saccharide conjugated with the wood.

In a further embodiment, a method of preserving a cellulose based product may include treating the cellulose based product with an effective amount of at least one saccharide resistant to micro-organism based degradation.

DETAILED DESCRIPTION

Wood, and cellulose based materials in general, are susceptible to deterioration by a variety of organisms. Biodegradation is primarily the result of enzymatic activities of microorganisms, primarily fungi which have the ability to digest wood and cause it to decay. Microorganisms may thrive on cellulose based materials when favorable conditions exist for the microorganisms. These conditions include an adequate supply of oxygen; favorable temperatures; a moisture content in excess of the fiber saturation point; a suitable source of energy and nutrients; and the absence of antagonistic influence of other organisms. In order to inhibit decay, it would be desirable to alter one or more of these conditions.

Chemical modification of wood may be one method of altering wood so that the conditions for microorganisms may no longer be favorable for their growth. In chemical modification methods, there may be a reaction of a chemical agent with the structural polymeric components of the wood to thereby alter the make-up of the wood. However, due to environmental concerns regarding the use of certain preservatives such as chromated copper arsenate, it is desirable to provide wood preservation techniques and products which are considered environmentally safe.

The primary components of wood are cellulose (about 40% to about 50%) and hemicellulose (about 15% to about 25%), both of which are polysaccharides of linked glucose units having a structure generally as shown.

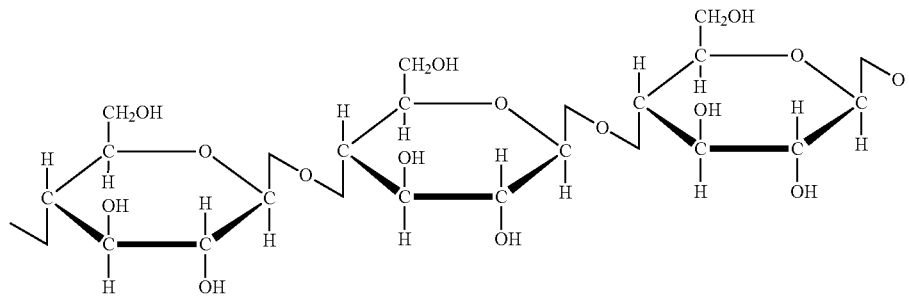

Cellulose may have linear chains of several hundred to over ten thousand glucose units, while hemicellulose has shorter branched chains of several hundred to only several thousand glucose units. As such, in the cell wall of wood, there can be a large number of glucose units that provide a free hydroxyl (—OH) site for chemical modification of the wood.

By modifying wood at this free hydroxyl site, at least two different mechanisms may contribute to the preservation of the wood. First, the sites may become biologically inert by conjugation with a biologically inert substance that microorganisms are not able to metabolize or catabolize. In this state, the wood may no longer provide a usable source of energy or nutrients. Secondly, the volume of the wood may be increased to create a persistent lower moisture content below that of the fiber saturation point, leaving essentially no 'free-water' in the wood for the organisms.

Figure 1:
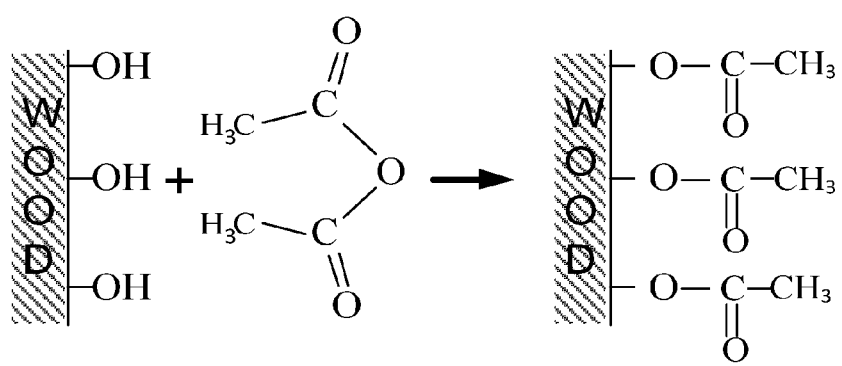
FIG. 1 depicts an illustrative acetylation of wood.

One way in which cellulose based products such as wood may be modified at this free hydroxyl site is by acetylation as shown in FIG. 1. In the acetylation process, wood is contacted with acetic anhydride, and acetyl groups may replace the hydroxyl groups and bond to the wood cell wall. This reaction may take place with acetic anhydride in the liquid phase, and the rate of reaction is diffusion dependent, with rapid reaction of the anhydride with the cell wall polymer —OH sites once the anhydride arrives at the sites. The reaction rate may be increased by raising the temperature and by the addition of catalysts.

Acetylation, however, has resultant process and environmental issues from disposal and handling of large quantities of acetic acid. Acetylation may also result in a polarity reduction of the wood. This reduction in polarity may cause drastic, negative effects on surface coating adhesion characteristics that have negative repercussions on painting, coating and gluing.

Figure 2:
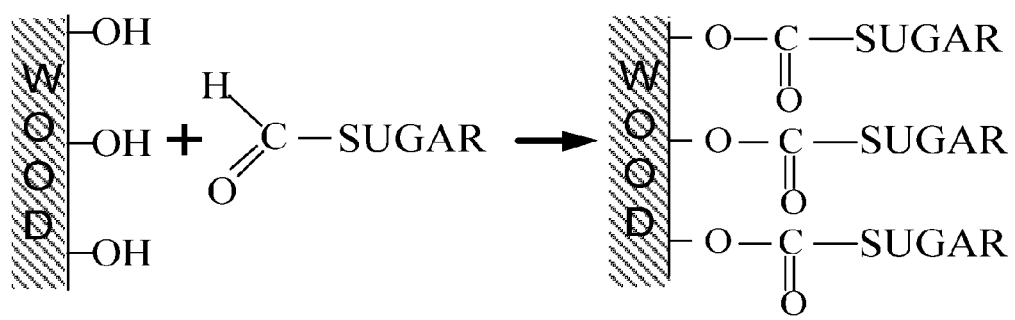
FIG. 2 depicts an illustrative esterification of wood according to an embodiment.

As an alternative to acetylation, covalent modification at the free hydroxyl groups may also be performed by transesterification with saccharides as shown in FIG. 2. Conjugation with saccharides may increase the volume of the wood and may decrease the moisture content to help preserve wood from degradation.

In an embodiment, rare saccharides (rare sugars) may be used to remove or block the biological substrate on which microorganisms feed. Rare saccharides and rare sugars may include any (1) monosaccharides and their derivatives that are rare in nature, (2) oligosaccharides and polysaccharides containing rare sugars, and/or (3) starting materials for production of rare sugars.

Biological organisms typically require enzymes to break down food sources. For example, the naturally occurring form of glucose, or D-glucose, may be broken down readily by enzymatic processes. However, its enantiomer, L-glucose, cannot typically be used by biological systems since most microorganisms do not generally carry enzymes which are capable of breaking down L-glucose. This may be the case for most, if not all, of the rare saccharides because biological organisms generally do not have enzymes for digesting or breaking down the rare saccharides.

There are a number of rare sugars which may be used for the preservative treatment of wood. Rare monosaccharides may include D-allose, D-altrose, D-gulose, D-idose, D-talose, L-allose, L-altrose, L-glucose, L-mannose, L-gulose, L-idose, L-galactose, L-talose, D-psicose, D-sorbose, D-tagatose, L-fructose, L-psiose, L-sorbose, L-tagatose, D-altritol, D-talitol, D-allitol, L-allitol, D-glucitol, L-gulitol, D-mannitol, D-gulitol, L-glucitol, D-iditol, D-galactitol, L-galactitol, L-altritol, L-talitol, L-mannitol, L-iditol, D-arabinose, D-lyxose, L-ribose, L-xylose, L-lyxose, D-ribulose, L-ribulose, D-ribitol, L-ribitol, D-arabitol, L-arabitol, D-xylitol, L-xylitol, L-erythrose, L-threose, L-erythrulose, D-erythritol, L-erythritol, D-threitol, L-threitol and combinations thereof.

In addition to monosaccharides, there are also di-saccharides which may be resistant to microorganism based degradation. Therefore, di-saccharides may also be used for the preservative treatment of wood. Exemplary di-saccharides may include sucrose, lactulose, lactose, maltose, trehalose, cellobiose, kojibiose, nigerose, isomaltose, β,β-trehalose, α,β-trehalose, sophorose, laminaribiose, gentiobiose, turanose, maltulose, palatinose, gentiobiulose, mannobiose, melibiose, melibiulose, rutinose, rutinulose, xylobiose and combinations thereof.

Further, there are also tri-saccharides which may be resistant to microorganism based degradation. Tri-saccharides may also be used for the preservative treatment of wood. Exemplary tri-saccharides may include isomaltotriose, nigerotriose, maltotriose, maltotriulose, raffinose and combinations thereof.

Still further, oligosaccharides may also be resistant to microorganism based degradation, and likewise be usable for the preservation of wood.

In general, any saccharide, including monosaccharides, polysaccharides, oligosaccharides, or combinations thereof, for which microorganisms lack the proper enzymes for degradation, may be used for preservation treatment of wood or any other cellulose based product to which they may be bonded. Some examples of different wood types which may be preserved by treatment with saccharides include, but are not limited to southern yellow pine, western red cedar, douglas fir, inland fir, spruce, hemlock, sugar maple, ash, walnut, cherry, white pine, red pine, birch, red oak, white oak, elm, hickory, linden, beech, and sycamore.

Figure 3:
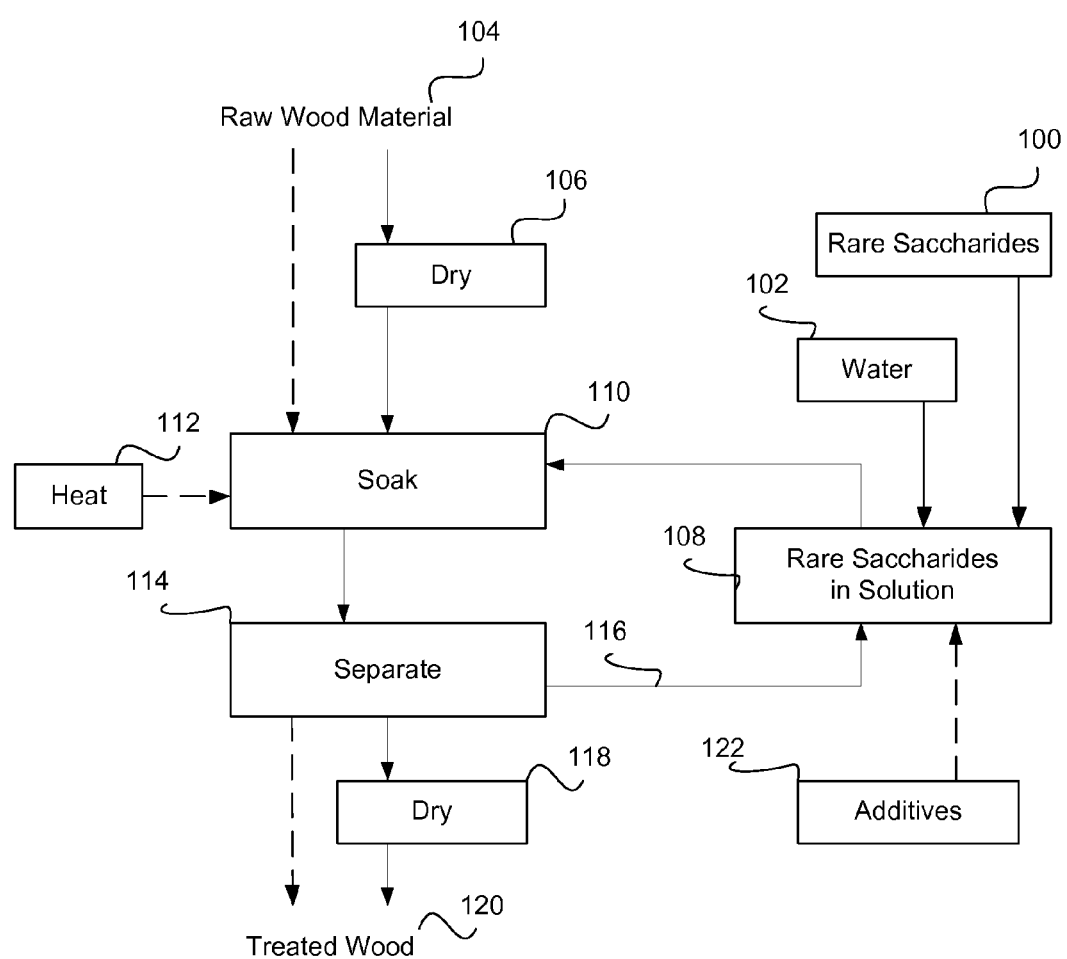
FIG. 3 depicts an illustrative process for treating wood according to an embodiment.

Cellulose-based products, such as wood, may be treated with the saccharides in a plurality of ways. FIG. 3 depicts a general flow diagram with process steps that may be used in various embodiments. Since most saccharides 100 are readily soluble in water 102, and most cellulose-based products (wood 104) readily take-up or soak-in water when simply put in contact with water, application by means of aqueous based solution may be one method of treatment. Moreover, aqueous solution applications would typically have no toxic or hazardous materials used in or resulting from the treatment process.

For some application procedures, raw wood material 104 may be at least partially dried 106 prior to treatment with the preservation solution 108. Alternatively, if the wood is already at a desirable moisture content, a drying step may not be used. In one embodiment, the wood may be dried to at least about 20% by weight (weight of the water in the wood is 20% of the weight of the same wood with essentially no water present). In alternative embodiments, it may be preferred that the wood be dried to at least about 15% by weight, or about 10% by weight, or about 5% by weight, or about 1% by weight, or any weight percentage from about 1% to about 20%, from about 5% to about 15%, or from about 8% to about 12%. It is typical for fresh-cut wood to have a moisture content from about 15% to about 20%, although this may be considerably higher depending on the climate conditions and the time of year at which the trees are cut down. The moisture content of pine may be as high as 100% (equal weight amounts of 'dry-wood' and water.)

Drying 106 of the wood 104 may be carried out by several different methods, alone, or in combination. Some of these methods may include air drying, air drying in a vacuum, kiln drying, kiln drying in a vacuum, solvent drying, solvent drying using both vacuum and pressure, electromagnetic radiation drying (radiofrequency—6 MHz to about 915 MHz or microwave—about 916 MHz to about 2450 MHz), and electromagnetic radiation drying in a vacuum. The time for drying may range from several hours for solvent drying, several days to a week, or weeks for kiln drying, and possibly a month or more for air drying.

Some drying methods, such as solvent drying and electromagnetic radiation drying may include the use of a containment vessel which may also be used for subsequent treatment with the saccharide solution, thereby minimizing equipment costs. In addition, some drying methods, such as kiln drying and electromagnetic radiation drying, may produce an increase in temperature of the wood, and since some subsequent treatment processes may be performed at an increased temperature to decrease the reaction time, an energy savings may result by not requiring additional heating steps.

For the preservation treatment 110, an aqueous based solution 108 of the saccharides may be from about 5% to about 75% by weight saccharides, or from about 10% to about 65%, or from about 15% to about 50%, or from about 20% to about 40% by weight saccharides. The actual concentration used may depend on the treatment process, the temperature during treatment, the type of wood, and/or other variables. The contact between the wood and the saccharide solution may be affected by numerous methods, such as brushing, spraying, painting, pressure treating, immersion, and/or any other methods which bring together the wood and the aqueous solution. In an embodiment, the wood may be immersed in the solution for a period of time sufficient to obtain the desired conjugation between the saccharide and the wood. The desired extent of conjugation is preferably from about 3% to about 30% by weight conjugated saccharides. The contact time may typically range from about 30 minutes to about three days or more depending on the contact method used, and the reaction conditions under which the contact is performed Immersion methods may have low labor costs, which reduce the relative expense.

In an embodiment, a vacuum/pressure tank may be used for treatment, and a vacuum may be applied to evacuate air from the wood. The vacuum may be carried out at pressures to about 0.5 bar, or less, and may be about 0.4 bar, or about 0.3 bar, or about 0.2 bar, or about 0.1 bar, or about 0.05 bar, or any pressure from about 0.05 bar to about 0.75 bar. Once evacuated, the treating solution may be added, followed by a subsequent release of the vacuum to increase the rate of penetration of the treating solution into the wood. Alternatively, the wood may be sealed in the tank, and the treating solution may be added, followed by application of pressure to force the treating solution into the wood. The applied pressure may be about 2.0 bar, about 3.0 bar, about 4.0 bar, about 5.0 bar, about 6.0 bar, about 7.0 bar, about 8.0 bar, about 9.0 bar, or any pressure from greater than atmospheric pressure to about 12.0 bar. In alternative embodiments, both vacuum and pressure may be used, or vacuum and pressure may be applied in alternating cycles. Each vacuum or pressure cycle may have a time duration of from about 5 minutes to about 10 minutes, or longer, depending on the type of wood and the desired penetration.

By using vacuum and/or pressure, the treating time may be reduced to possibly 30 minutes or less. With some types of wood, such as southern pines, the treating time may be as short as about 15 minutes. Some examples of pine woods which have shorter treatment times include loblolly, slash, longleaf, shortleaf, or radiata pine.

In various embodiments, the treatment step, or steps, may be carried out with or without additional heating 112. Such a heating step may result in shortened contact times by speeding up the transesterification bonding of the saccharides with the cellulose of the wood. In an embodiment, the wood or the aqueous solution may be heated independently from one another. For example, the wood may be residually heated from a drying process as mentioned previously. Alternatively, the wood and the solution may be combined in a reaction vessel and subsequently heated. Some examples of heating processes which may be used include application of external heat sources to the reaction vessel. The external heat may come from combustive heating, recycled heat from an exterior source, microwave or radiofrequency radiation heating, and/or combinations thereof. Suitable temperatures for heating may range from about 30° C. to about 150° C., with the upper limit being the combustion temperature for the wood being treated. Additional temperatures include from about 40° C. to about 140° C., from about 50° C. to about 130° C., from about 60° C. to about 120° C., and from about 70° C. to about 110° C.

Once the desired esterification level is attained, the treatment solution and treated wood product 120 may be separated 114 and used treatment solution may be recycled 116 for treating additional wood product 104. Depending on the treatment method being used, the separation step may include lifting the wood out of an immersion tank, draining the liquid from an immersion tank, catching residual spray or drippings, and/or combinations thereof.

In an embodiment an additional drying step 118 may be performed to remove excess moisture from the treated wood 120. This may particularly be the case when immersion treatment is used. Such a drying step may involve air drying, kiln drying, electromagnetic radiation drying, combinations of such drying methods and/or other drying methods.

For treated wood products 120 requiring additional performance characteristics depending on the intended use for the wood products, additional additives 122 may be included in the treatment solution. Some of these additives may include, without limitation, anti-foam agents, surfactants, antioxidants, flame-retardant compositions, coloring agents, insecticides, deodorants, mobicides, wood-stabilizing agents, and combinations thereof. The amount of such optional additives included in a composition may vary, although amounts from about 0.1% to about 10% by weight may be used, or from about 0.5% to about 8% by weight, or from about 1% to about 5% by weight.

Figure 4:
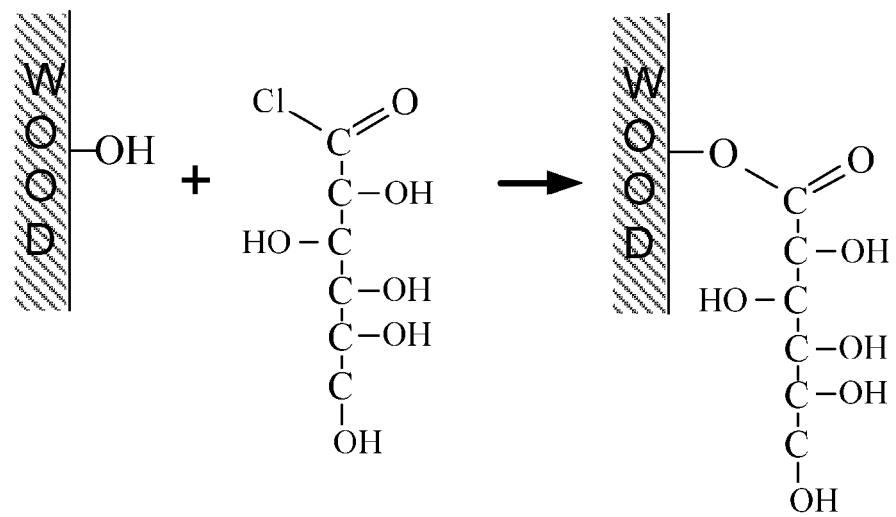
FIG. 4 depicts an illustrative electrophilic addition reaction for treating wood according to an embodiment.
Figure 5:
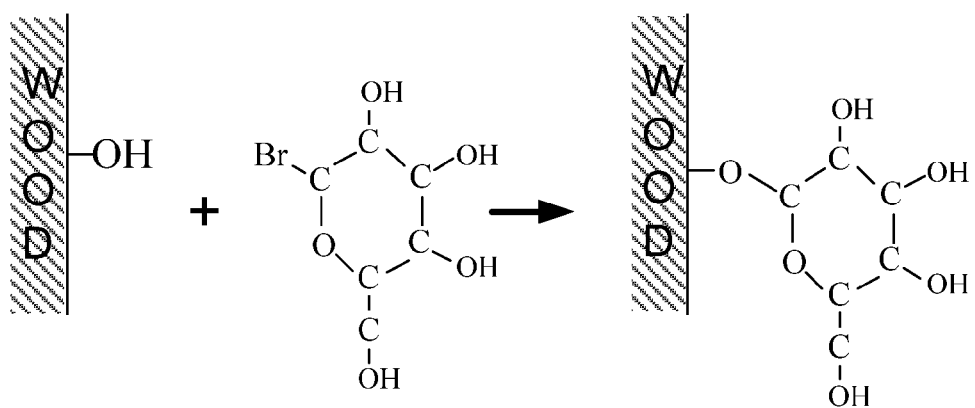
FIG. 5 depicts an illustrative Koenigs-Knorr reaction for treating wood according to an embodiment.

While the above described process steps essentially provide for conjugation of saccharides with the free hydroxyl group through an ester bond by simple substitution, several other methods may be used as well, and this description is not meant to be limiting to only those described herein. For example, esterification may be performed using an electrophilic addition reaction (illustrated in FIG. 4), by substituting a chloride or other halide on the saccharide to create an electrophilic derivative, and substituting the halogenated saccharide onto the wood cell wall. In an alternative embodiment, a Koenigs-Knorr reaction (illustrated in FIG. 5) may be used wherein glycosyl halides (halide derivatives of sugars) react with the free hydroxyl groups in the presence of a silver carbonate catalyst. The reaction rate for any reaction process may be increased by raising the temperature and/or by the addition of catalysts.

The overall stability of wood may be increased by esterification with saccharides. Wood may swell as a result of the esterification because the chemically bonded saccharide groups occupy space in the cell wall. This swelling may be determined by measuring the external dimensions of oven dried wood samples before and after modification.

Once esterified, wood may be less susceptible to shrinking and swelling in the presence of varying atmospheric conditions. This may be attributed to the filling of the cell wall with chemically bonded saccharide groups which take up space within the cell wall. The wood may thereby be in a consistent swollen condition, the extent of which depends upon the level of modification. Once modified, very little residual swelling may occur, even when the wood is soaked in water. Since shrinking and swelling are minimized by bulking with bound saccharides, the dimensional stability of the wood, in addition to its decay resistance, may also be enhanced.

The stability of ester bond linkages to cell wall polymers have shown that under normal service conditions, esterified wood exhibits good stability with relatively little loss of the bound molecules. Saccharide treated wood similarly provides a sufficient service life for use as required.

Example 1

A Wood Treatment Process

Fresh cut pine boards (104 in FIG. 3) having dimensions of 1 inch×6 inch×8 feet (2.54 cm×15.24 cm×2.44 m) will be obtained and stacked with spacers therebetween to allow for drying from all sides. The stacked boards will be placed inside a drying kiln, where they will be dried 106 for about 7 days to a moisture content of about 5%.

A tank having dimensions appropriate for containing the stacked wood therein will be obtained and the volume will be calculated for determining an approximate amount of treating solution 108 to be prepared. For a tank having dimensions of about 10 ft×5 ft×5 ft (3.0 m×1.5 m×1.5 m), about 1,500 gallons (5,700 liters) of treating solution 108 will be needed to fill the tank. For an approximately 35% L-glucose solution by weight, about 3,070 kg of L-glucose 100 will be dissolved in 5,700 kg (liters) of water 102–3070 kg glucose/(3,070 kg glucose+5,700 kg water)=0.35. This will provide an excess of solution 108 as the wood will also be occupying a portion of the volume of the tank.

The kiln dried pine boards will be deposited in the treatment tank and the tank will be filled with the 35% L-glucose solution to completely cover the wood. A pump will be provided for circulating the treating solution through the stacked boards, and the arrangement will be left soaking 110 for approximately 72 hours, or three days, at ambient temperature of about 20° C.

The solution will then be drained 116 from the tank, and the boards, being substantially liquid saturated, will be left in the tank for about 1 additional hour to allow additional excess liquid to drain off. The wet treated boards will be removed from the tank for additional drying 118, wherein the boards will be transferred back to a kiln, similar to the one used for the initial drying, and will be dried to a moisture content of at least about 20%. The resultant treated wood boards 120 will then have the rare sugar L-glucose conjugated with the wood fiber to prevent degradation of the wood.

Example 2

A Wood Treatment Process with Disaccharides

Fresh cut pine boards 104 having dimensions of 1 inch×6 inch×8 feet (2.54 cm×15.24 cm×2.44 m) will be obtained and stacked with spacers therebetween to allow for drying from all sides. The stacked boards will be placed inside a drying vessel, where they will be dried 106 by solvent drying with acetone. A vacuum will first be applied to the wood at a pressure of 0.1 bar for about 5 minutes to remove air. The wood 104 will then be fully covered with acetone and a pressure of about 5 bar will be applied for about 10 minutes to impregnate the acetone into the wood 104. The vessel will then be drained and the wood 104 will be heated by microwave at 1150 MHz to a temperature of about 130° C. to remove any residual solvent and/or water to a moisture content of about 2% by weight.

For a vessel having dimensions of about 10 ft×5 ft×5 ft (3.0 m×1.5 m×1.5 m), about 1,500 gallons (5,700 liters) of treating solution of 50% lactose will be prepared by dissolving 5700 kg of lactose 100 in 5,700 kg (liters) of water 102–5700 kg lactose/(5700 kg lactose+5,700 kg water)=0.35. This will provide an excess of solution 108 as the wood will also be occupying a portion of the volume of the tank.

The dried boards will be deposited in the treatment vessel and the tank will be evacuated to about 0.1 bar for about 5 minutes to remove air. The evacuated tank will be filled with the 50% lactose solution to completely cover the wood. Pressure of about 5 bar will then be applied for about 10 minutes to force the treating solution into the wood 110. The vacuum and pressure cycles will be repeated, and the tank drained. The overall treatment time will be about 40 minutes.

The treated boards, being substantially liquid saturated, will be heated 118 by microwave at 1150 MHz to a temperature of about 130° C. to remove any excess water to produce a finished product 120 having a moisture content of about 15%.

Example 3

Comparison of Treated vs. Untreated Wood

Pine boards will be treated by the method of example 1 to a final wood product having an approximate 20% weight gain from conjugated L-glucose. For this 20% weight gain product the wood may have an increased dimensional stability of about 70%, which means that the treated wood may shrink and swell by about ¼ of the amount by which the untreated wood shrinks or swells. Also, according to European Standard EN-350-2 for wood durability against wood-destructive fungi (class 1—very durable, class 2—durable, class 3—moderately durable, class 4—poorly durable, class 5—non-durable), the treated wood with the 20% weight gain may exhibit an increase in durability which may enable it to be classified into class 1, whereas the untreated product may be in class 5. The wood treated with L-glucose may therefore, not only show an increased resistance to fungi, but also an increased dimensional stability. In addition, when compared with other treatment processes, such as acetylation, the L-glucose treated wood may exhibit several other advantages as well.

Retention of adhesion characteristics—bulking of wood by saccharides may not cause a significant polarity reduction as occurs with acetylation thereby not effectively changing surface binding characteristics.

Less reagent use—less saccharide reagent may be required (by mol) to achieve an equivalent percentage of bulking by weight as with acetylation (L-glucose is about 4 times heavier than acetyl—180.15 g/mol vs. 46.02 g/mol).

Non-toxic and environmentally safe—saccharides are environmentally safe and essentially non-toxic if released from the treated wood.

Biologically inert—using rare, or unnatural sugars provides native, biologically inert substrates.

Environmentally benign process—production of treated wood will not create toxic byproducts as occurs with the production of acetic acid in making acetylated wood.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, may be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which may, of course, vary. It is also to be understood that the terminology used herein is for the purpose of describing particular embodiments only, and is not intended to be limiting.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," and the like include the number recited and refer to ranges which may be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of preserving a cellulose based product, the method comprising treating the cellulose based product with an effective amount of at least one rare saccharide.

2. The method of claim 1, wherein the at least one rare saccharide comprises at least one rare sugar.

3. The method of claim 2, wherein the at least one rare sugar is one or more of the following monosaccharides: D-allose, D-altrose, D-gulose, D-idose, D-talose, L-allose, L-altrose, L-glucose, L-mannose, L-gulose, L-idose, L-galactose, L-talose, D-psicose, D-sorbose, D-tagatose, L-fructose, L-psiose, L-sorbose, L-tagatose, D-altritol, D-talitol, D-allitol, L-allitol, D-glucitol, L-gulitol, D-mannitol, D-gulitol, L-glucitol, D-iditol, D-galactitol, L-galactitol, L-altritol, L-talitol, L-mannitol, L-iditol, D-arabinose, D-lyxose, L-ribose, L-xylose, L-lyxose, D-ribulose, L-ribulose, D-ribitol, L-ribitol, D-arabitol, L-arabitol, D-xylitol, L-xylitol, L-erythrose, L-threose, L-erythrulose, D-erythritol, L-erythritol, D-threitol, L-threitol, other L-form sugars.

4. The method of claim 1, wherein the treating comprises contacting the cellulose based product with an aqueous solution of about 5% to about 75% by weight of the at least one rare saccharide.

5. The method of claim 4, wherein the contacting comprises one or more of the following: immersion in the aqueous solution, spraying with the aqueous solution, brushing with the aqueous solution, and pressure treating with the aqueous solution, for a period of time of about 30 minutes to about 3 days.

6. The method of claim 4, wherein the treating further comprises heating at least one of the cellulose based product and the aqueous solution during at least a portion of the contacting to a temperature of about 30° C. to about 150° C.

7. The method of claim 1, wherein:
the cellulose based product comprises free hydroxyl groups; and
the treating comprises esterification of at least a portion of the free hydroxyl groups by the at least one rare saccharide to provide cellulose based product having about 3% to about 30% by weight conjugated saccharides.

8. The method of claim 1, further including drying the cellulose based product to a moisture content of less than about 15% by weight prior to the treating, by at least one of: air drying, air drying in a vacuum, kiln drying, kiln drying in a vacuum, solvent drying, solvent drying in a vacuum, electromagnetic radiation drying, and electromagnetic radiation drying in a vacuum.

9. The method of claim 1, wherein:
the cellulose based products comprise free hydroxyl groups;
the at least one rare saccharide comprises at least one glycosyl halide of the rare saccharide; and
the treating comprises contacting the cellulose based product with the at least one glycosyl halide in the presence of a catalyst for reaction of at least a portion of the free hydroxyl groups with the glycosyl halide to form glycosides.

10. The method of claim 9, wherein the catalyst is silver carbonate.

11. The method of claim 1, wherein:
the cellulose based products comprise free hydroxyl groups;
the at least one rare saccharide comprises at least one halogenated derivative of the at least one rare saccharide, the at least one halogenated derivative having at least one halogen bonded thereto; and
the treating comprises contacting the cellulose based product with the at least one halogenated derivative for reaction of at least a portion of the free hydroxyl groups with the at least one halogenated derivative for displacement of the halogen with the hydroxyl group.

12. A wood product preserved by treating with at least one rare saccharide.

13. The wood product of claim 12, wherein the at least one rare saccharide comprises at least one rare saccharide resistant to micro-organism based degradation.

14. The wood product of claim 12, wherein the at least one rare saccharide comprises at least one rare sugar.

15. The wood product of claim 14, wherein the at least one rare sugar is one or more of the following: D-allose, D-altrose, D-gulose, D-idose, D-talose, L-allose, L-altrose, L-glucose, L-mannose, L-gulose, L-idose, L-galactose, L-talose, D-psicose, D-sorbose, D-tagatose, L-fructose, L-psiose, L-sorbose, L-tagatose, D-altritol, D-talitol, D-allitol, L-allitol, D-glucitol, L-gulitol, D-mannitol, D-gulitol, L-glucitol, D-iditol, D-galactitol, L-galactitol, L-altritol, L-talitol, L-mannitol, L-iditol, D-arabinose, D-lyxose, L-ribose, L-xylose, L-lyxose, D-ribulose, L-ribulose, D-ribitol, L-ribitol, D-arabitol, L-arabitol, D-xylitol, L-xylitol, L-erythrose, L-threose, L-erythrulose, D-erythritol, L-erythritol, D-threitol, L-threitol, other L-form sugars.

16. The wood product of claim 12, wherein the treating comprises contacting the wood product with an aqueous solution of about 5% to about 75% by weight rare saccharide for a period of time from about 30 minutes to about 3 days, by one or more of the following: immersion in the aqueous solution, spraying with the aqueous solution, brushing with the aqueous solution, and pressure treating with the aqueous solution.

17. The wood product of claim 12, wherein the wood product comprises free hydroxyl groups and at least a portion of the free hydroxyl groups are conjugated with the at least one rare saccharide by ester bonds.

18. The wood product of claim 17, wherein the wood product comprises from about 3% to about 30% by weight at least one rare saccharide conjugated by ester bonds.

19. The wood product of claim 12, wherein:
the wood product comprises free hydroxyl groups;
the at least one rare saccharide comprises at least one glycosyl halide of the at least one rare saccharide; and
the treating comprises contacting the wood product with the at least one glycosyl halide in the presence of a catalyst for reaction of at least a portion of the free hydroxyl groups with the glycosyl halide to form glycosides.

20. The wood product of claim 12, wherein:
the wood product comprises free hydroxyl groups;
the at least one rare saccharide comprises a halogenated derivative of the at least one rare saccharide, the at least one halogenated derivative having at least one halogen bonded thereto; and
the treating comprises contacting the wood product with the at least one halogenated derivative for reaction of at least a portion of the free hydroxyl groups with the at least one halogenated derivative for displacement of the at least one halogen with the hydroxyl group.

21. A treated wood product comprising at least one rare saccharide conjugated with the wood.

22. The treated wood product of claim 21, comprising from about 3% to about 30% by weight conjugated at least one rare saccharide.

23. The wood product of claim 21, wherein the at least one rare saccharide comprises at least one rare saccharide resistant to micro-organism based degradation.

24. The wood product of claim 21, wherein the at least one rare saccharide comprises at least one rare sugar.

25. The wood product of claim 21, wherein the wood product comprises free hydroxyl groups, and the at least one rare saccharide is conjugated with the free hydroxyl groups by an ester bond.

26. A method of preserving a cellulose based product, the method comprising treating the cellulose based product with an effective amount of at least one saccharide resistant to micro-organism based degradation to provide cellulose based product having from about 3% to about 30% by weight conjugated saccharides.

27. The method of claim 26, wherein the at least one saccharide comprises one or more of the following monosaccharides: D-allose, D-altrose, D-gulose, D-idose, D-talose, L-allose, L-altrose, L-glucose, L-mannose, L-gulose, L-idose, L-galactose, L-talose, D-psicose, D-sorbose, D-tagatose, L-fructose, L-psiose, L-sorbose, L-tagatose, D-altritol, D-talitol, D-allitol, L-allitol, D-glucitol, L-gulitol, D-mannitol, D-gulitol, L-glucitol, D-iditol, D-galactitol, L-galactitol, L-altritol, L-talitol, L-mannitol, L-iditol, D-arabinose, D-lyxose, L-ribose, L-xylose, L-lyxose, D-ribulose, L-ribulose, D-ribitol, L-ribitol, D-arabitol, L-arabitol, D-xylitol, L-xylitol, L-erythrose, L-threose, L-erythrulose, D-erythritol, L-erythritol, D-threitol, L-threitol, other L-form sugars.

28. The method of claim 26, wherein the at least one saccharide comprises one or more of the following disaccharides: sucrose, lactulose, lactose, maltose, trehalose, cellobiose, kojibiose, nigerose, isomaltose, $\beta,\beta$-trehalose, $\alpha,\beta$-trehalose, sophorose, laminaribiose, gentiobiose, turanose, maltulose, palatinose, gentiobiulose, mannobiose, melibiose, melibiulose, rutinose, rutinulose, and xylobiose.

29. The method of claim 26, wherein the at least one saccharide comprises one or more of the following trisaccharides: isomaltotriose, nigerotriose, maltotriose, maltotriulose, and raffinose.

30. The method of claim 26, wherein the at least one saccharide comprises one or more L-form oligosaccharides.

* * * * *

UNITED STATES PATENT AND TRADEMARK OFFICE
CERTIFICATE OF CORRECTION

| | |
|---|---|
| PATENT NO. | : 8,642,183 B2 |
| APPLICATION NO. | : 13/575549 |
| DATED | : February 4, 2014 |
| INVENTOR(S) | : Chen |

It is certified that error appears in the above-identified patent and that said Letters Patent is hereby corrected as shown below:

In the Specification:

In Column 5, Lines 36-37, delete "performed" and insert -- performed. --, therefor.

In the Claims:

In Column 12, Line 51, in Claim 23, delete "The" and insert -- The treated --, therefor.

In Column 12, Line 54, in Claim 24, delete "The" and insert -- The treated --, therefor.

In Column 12, Line 56, in Claim 25, delete "The" and insert -- The treated --, therefor.

Signed and Sealed this
First Day of July, 2014

Michelle K. Lee
*Deputy Director of the United States Patent and Trademark Office*